United States Patent [19]

Shaw et al.

[11] Patent Number: 4,936,148
[45] Date of Patent: Jun. 26, 1990

[54] HALL EFFECT PRESSURE TRANSDUCER

[75] Inventors: Clyde C. Shaw, Redwood City; William G. Wakeman; John H. Orio, both of San Jose, all of Calif.

[73] Assignee: Anent Systems Corporation, Mesa, Ariz.

[21] Appl. No.: 258,620

[22] Filed: Oct. 17, 1988

[51] Int. Cl.$^5$ .......................... G01L 7/08; G01L 9/10
[52] U.S. Cl. ..................................... 73/728; 338/32 H
[58] Field of Search ................ 73/722, 728, 719, 725; 338/32 H, 42; 336/30

[56] References Cited

U.S. PATENT DOCUMENTS

| | | | |
|---|---|---|---|
| 3,575,054 | 4/1971 | Glista | 73/728 |
| 4,254,395 | 3/1981 | Herden | 338/42 |
| 4,326,419 | 4/1982 | Herden | 73/728 |
| 4,340,877 | 7/1982 | Herden | 338/42 |
| 4,352,085 | 9/1982 | Herden | 338/42 |
| 4,484,173 | 11/1984 | Everett | 338/42 |
| 4,487,074 | 12/1984 | Herden | 73/708 |
| 4,667,514 | 5/1987 | Baer | 73/728 |

Primary Examiner—Donald O. Woodiel
Attorney, Agent, or Firm—Philip A. Dalton

[57] ABSTRACT

A Hall effect pressure transducer incorporates a pressure-deflection diaphragm which has patterned depressions therein to enhance linearity of response; an O-ring diaphragm seal which seals the diaphragm against pressure leaks without affecting the linearity of response; a pair of magnets, preferably rectangular, oriented with their North-South axes oppositely parallel, and oriented transverse to the deflection axis of the diaphragm to provide a uniform magnetic field gradient and sensitive, accurate, linear response of the transducer to either positive or negative pressure-induced deflections of the diaphragm.

9 Claims, 3 Drawing Sheets

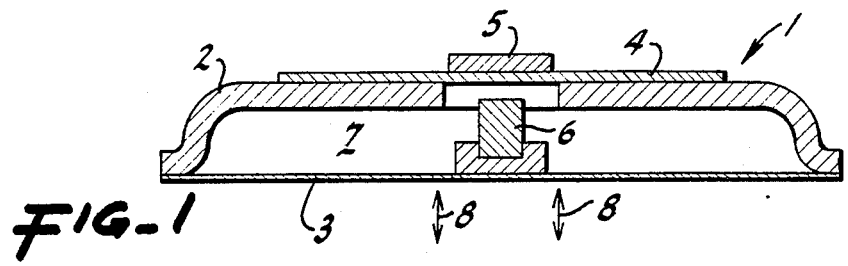
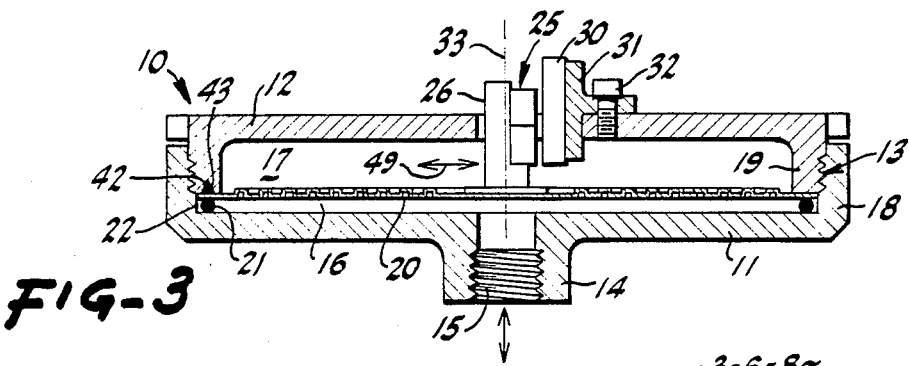
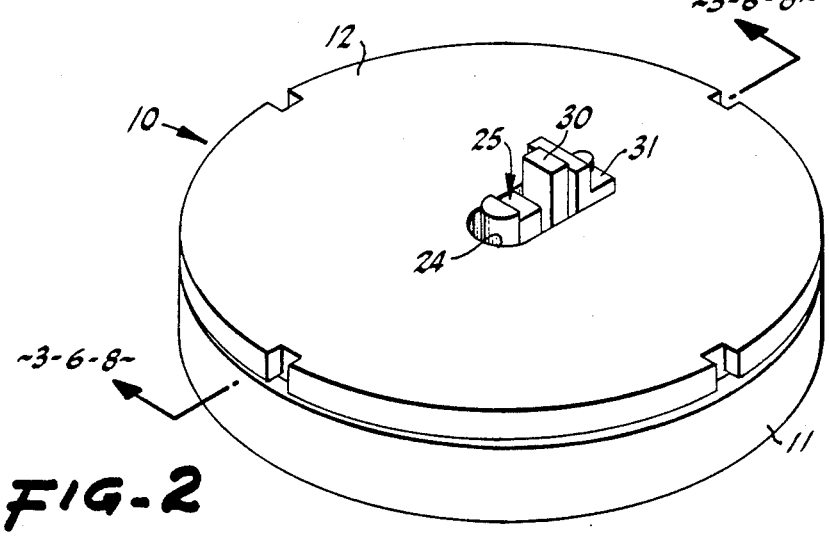
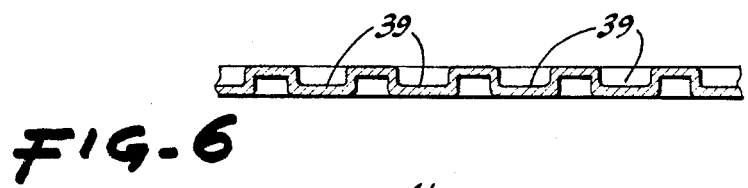
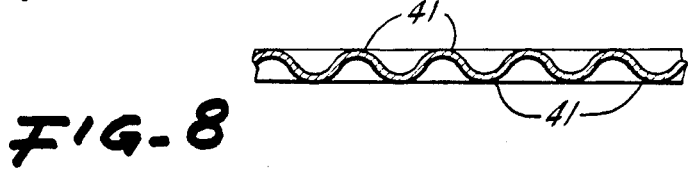

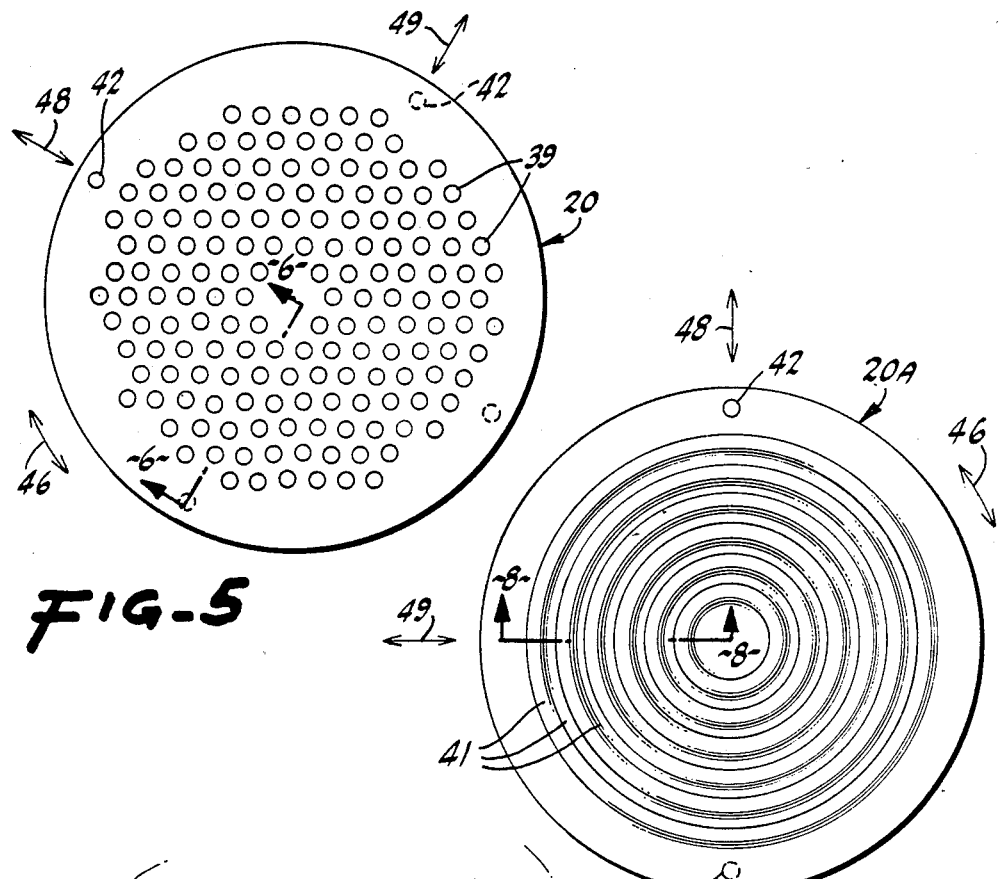
FIG-5
FIG-7
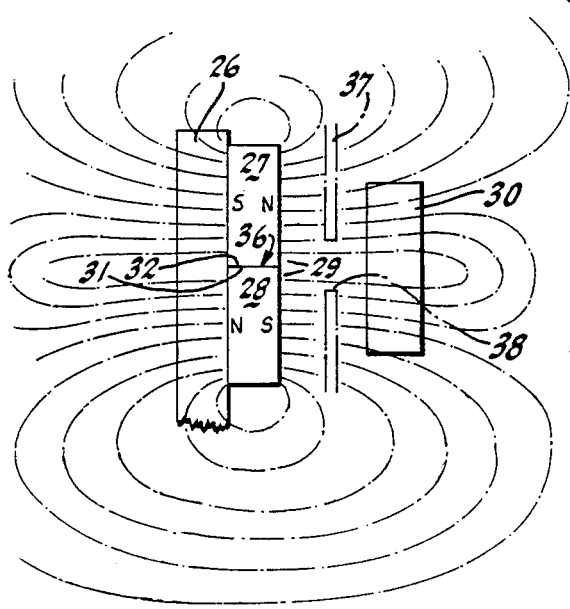
FIG-4

HALL EFFECT PRESSURE TRANSDUCER

FIELD OF THE INVENTION

This invention relates to pressure transducers and, in particular, to Hall effect pressure transducers.

BACKGROUND OF THE INVENTION

Recently, there have been developed pressure transducers based upon the galvanomagnetic technology or Hall effect, which defines the relationship between an applied magnetic field, an applied constant current (constant under all conditions of magnetic field and temperature) and the resultant voltages generated across or through a semi-conducting material. Such transducers may include a Hall effect sensor which is mounted on a diaphragm and located between two magnets so that the sensor moves when pressure is applied to the diaphragm.

However, in such devices, the desired linearity of the response curve, voltage output vs. pressure, is not achieved. This non-linearity applies in part because the displacement of a flat, rigidly mounted diaphragm follows a third power law, $d^3$, where d is the diaphragm displacement and in part because over small distances, the magnetic field intensity is proportional to a squared function, $1/r^2$, where r is the distance from the magnet. Except under certain limited conditions and over small pressure ranges, the combination of these two factors, diaphragm displacement and magnetic field variation, typically results in a non-linear response curve of the type illustrated schematically by curve 9, FIG. 9.

SUMMARY OF THE INVENTION

It is an object of the present invention to provide a highly sensitive Hall effect pressure transducer the type in which pressure-induced deflection of a diaphragm and movement of magnet means mounted thereon and its associated magnetic field are converted by the sensor into an electrical signal which is proportional to the pressure variation, and which provides an output signal that is a linear function of pressure in the test chamber and which is relatively insensitive to shock and vibration.

In one aspect, the features of the present invention which satisfy the above and other objectives include the use of a diaphragm, the deflection of which is linearized, by incorporating patterned depressions, randomly or periodically spaced, preferably dimples of but not limited to hemispherical shape, or annular corrugations, thereby altering the surface of the diaphragm into a series of connected but localized linear leaf spring segments which act as individual linear displacement sectors. This mechanical alteration of a flat diaphragm alters the cubic law deflection dependence to provide an extended range linear diaphragm operation.

In another aspect, the features of the present invention which satisfy the above and other objectives include the use of an O-ring peripheral seal for the diaphragm which performs the necessary sealing function without hindering diaphragm flexure and flexibility at its outer edge and, as a consequence, providing increased sensitivity and linearity. To maintain cyclic repeatability in conjunction with the use of an O-ring, a peripheral point restraint in the form of a peripheral ball(s) and cup(s) restraint may be incorporated into the diaphragm (ball) and its mating support face (cup) to prevent unwanted relative movement between the magnet means and sensor without degrading "free" flexure of the diaphragm.

In still another aspect, the features of the present invention which satisfy the above and other objectives include the use of magnet means which comprises a pair of juxtaposed, preferably rectangular or square magnets. The magnetic poles at each end of the magnet pair are reversed and of opposite polarity, i.e., north-south at one end and south-north at the other. The north-south poles are immediately adjacent and facing outward or perpendicular to the central rotation axis of the diaphragm and are rigidly attached to the diaphragm along this axis with the interfacial line joining the north-south pole pair oriented such that it is perpendicular to the direction of motion of the central rotation axis of the diaphragm. The Hall effect sensor faces the magnetic pole pair and is rigidly mounted in a fixed plane independent of the magnet pair and the diaphragm and parallel to the plane of the magnet faces and with these planes being in immediate proximity to each other with the center of the Hall effect sensor directly over the center of the interfacial line separating the north-south poles of the magnet faces. In this manner, a very localized, intense, uniformly varying and confined magnetic field gradient is produced at the interface between the two poles and is relatively uniform along the interface line joining the north-south poles of the magnet pair, thus minimizing errors that arise from mechanical misalignment and thermal expansion. In this manner with the faces of the pole pair and the Hall effect sensor in close juxtaposition and parallel, the lines of magnetic intensity are relatively uniform and parallel in spatial extent and tend to linearize the $1/r^2$ dependency that would be encountered under normal magnetic field conditions.

In short, the pair of juxtaposed, oppositely oriented, preferably rectangular magnets provide an intense magnetic field which is concentrated or localized within a relatively small area proximate the interface of the two magnets and is of uniform field gradient and mirror imaged on either side of the interfacial line separating the magnets, thereby providing enhanced accuracy, sensitivity and linearity of response in the transducer.

As mentioned, preferably the magnets are of rectangular or square cross-section and are placed side-by-side in intimate contact. More generally, a pair of magnets may be used which have planar mating faces. Instead of intimate contact, the magnets may be placed in close proximity, preferably using a thin non-magnetic film or a highly permeable metal sheet between them. The preferable configuration is, however, intimate contact.

BRIEF DESCRIPTION OF THE DRAWINGS

The above and other aspects of the present invention are disclosed in conjunction with the included drawings (which are not to scale), in which:

FIG. 1 is a vertical section through a Hall effect pressure transducer;

FIG. 2 is a perspective view of a preferred Hall effect pressure transducer incorporating the principles of the present invention;

FIG. 3 is a vertical section taken along line 3—3 in FIG. 2;

FIG. 4 is a schematic depiction, not to scale, of the magnetic field lines associated with the magnet means used in the transducer of FIG. 3 and showing the physical relationship of the Hall effect sensor to the magnet means and to the associated magnetic field;

FIG. 5 is a top plan view of the diaphragm used in the device of FIG. 3;

FIG. 6 is a vertical section taken along line 6—6 in FIG. 5;

FIG. 7 is a top plan view of an alternative corrugated embodiment of the diaphragm of FIG. 5;

FIG. 8 is a vertical sectional view taken along line 8—8 of FIG. 7;

DETAILED DESCRIPTION OF THE PREFERRED EMBODIMENT(S)

Figure 10:
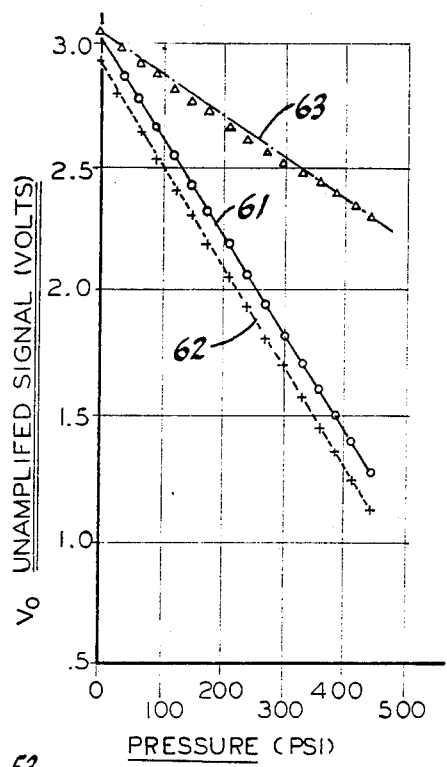
FIG. 10 depicts the linear response associated with the device of FIGS. 2 and 3, which embodies the present invention.

Referring to FIGS. 2 and 3, in a presently preferred embodiment, the Hall effect transducer device 10 embodying the present invention comprises a housing which includes a circular base 11 and a circular cap or cover 12. The base 11 has a central inlet 14 which may be adapted as by threads 15 for connection to an inlet tube (not shown) or other means for admitting positive or negative pressure to the housing and typically for admitting fluid under pressure to chamber 16. The cover 12 is adapted for attachment to the base 11, for example, via mating threads 13 formed in the side 18 of the base and in the mating side 19 of the cover 12.

A diaphragm 20 is positioned between an O-ring 21 located in a peripheral recess 22 defined above the base 11 and beneath the bottom edge of the side 19 of the cover. The adjustable screw-type axial cover 12 seats against the diaphragm, lightly compressing the O-ring 21 between the periphery of the diaphragm 20 and the base 11, and thereby sealing the inlet chamber 16 and preventing fluid leakage between the inlet chamber and reference chamber 17.

Referring further to FIGS. 2 and 3, magnet means 25 preferably comprising two rectangular magnets 27 and 28, FIG. 4, is mounted on a vertical support post 26 which is joined to the center of diaphragm 20, as by laser or spot welding. The magnets form an associated magnetic field region 29, FIG. 4, experienced by a Hall effect sensor 30 which is mounted in closely spaced juxtaposition to the magnets on a support member 31 which itself is attached to the cover 12, for example, by screw 32. As is shown perhaps most clearly in FIG. 2, the vertically movable magnet means 25 and the stationary Hall effect sensor 30 may be positioned in a slotted aperture 24 in the device cover 12.

Figure 9:
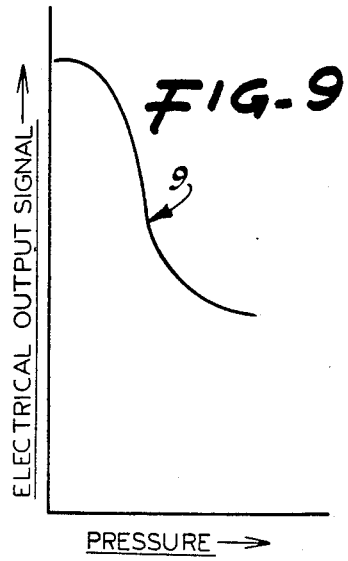
FIG. 9 depicts the voltage vs. pressure response curve of typical prior art Hall effect transducers.

The construction and configuration of the transducer 10 incorporates and provides several improvements which provide sensitivity and the near-perfect linearity of response evidenced in FIG. 10, in distinct contrast to the highly non-linear prior art response, FIG. 9.

Figure 11B:
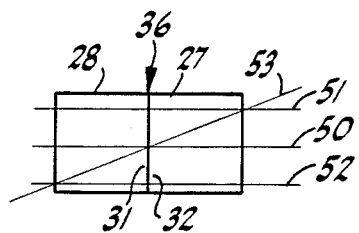
FIGS. 11A and 11B depict the path of relative movement of a Hall effect sensor along, respectively, circular magnets and rectangular or square magnets.

First, and referring to FIG. 4 as well as to FIG. 3, in a presently preferred embodiment, the magnet means comprises a pair of magnets which have planar adjacent sides 31 and 32, and preferably are of a rectangular or square cross-sectional configuration (see, also FIG. 11B) transverse to the plane of FIG. 4 and to the magnetic flux lines 29 therein. The magnets are mounted to the support 26 with their North and South pole axes oriented parallel to the plane of the diaphragm 20 and perpendicular to the axis 33 of deflection and directed oppositely (i.e., with the North and South poles at opposite ends of the respective magnets, as shown in FIG. 4). The magnets are closely spaced along interface 36 and, preferably, are positioned touching one another (i.e., without any gap therebetween). As a result of this preferred configuration and orientation, the magnets provide an intense, localized field comprising parallel magnetic lines of flux 29, FIG. 4, in the region proximate the interface 36, which preferably is centered on the device 30, and the magnetic lines of field intensity in a plane parallel to the magnet faces and in close proximity to the interface 36 are nearly parallel and the field gradient uniformly decreases in intensity within that plane while moving positionally away from the interfacial line dividing the magnetic pole faces. Also, these lines are symmetric or mirror imaged on either side of that interfacial line.

In short, the mating, preferably rectangular or square magnets provide an intense, localized, uniformly varying magnetic field in the region adjacent the magnet interface, thereby providing enhanced linearity, sensitivity and response to the sensor 30. The use of two magnets increases sensitivity by about two orders of magnitude over that achieved with a single magnet, while the uniformly changing, field gradient seen by the sensor enhances linearity and overall system accuracy. The pressure-induced displacement of the diaphragm is very small, usually about one millimeter, and, as a consequence, requires great sensitivity and linearity of response, which requirements are satisfied by the arrangement and configuration of the magnets used in device 10.

Figure 11A:
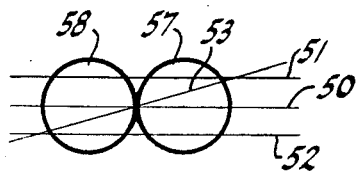

The described magnet arrangement and configuration substantially eliminate the fringing effects and the sensitivity to the path of the sensor along the magnet(s) associated with single magnets or with adjacent circular or otherwise curved magnets. To illustrate, and referring to FIG. 11A, for circular magnets 57 and 58 the associated magnetic field is relatively uniform only along path 50 through the center of the magnets and their interface but not along other paths such as 51–53. In contrast, and referring to FIG. 11B, the magnetic field associated with the rectangular magnets 27 and 28 used in the present device 10 is uniform along various paths across the magnets such as 50–53. Thus, the device 10 provides a uniform field gradient which is relatively insensitive to (forgiving of) the relative path of movement of the magnet and sensor, so long as the spacing between the magnets and the sensor 30 remains constant.

Alternatively or optionally, a mask 37, FIG. 4, having an aperture 38 can be used to enhance the linearity of response of sensors including the sensor 30, by shunting portions of the magnetic field away from the Hall effect sensor to achieve a linear response. It should be noted that the size and configuration of the aperture 38 can be tailored to other magnet arrangements, including but not limited to, single cylindrical magnets, to enhance the linearity of response, albeit with greater difficulty and with less satisfactory results than are possible using the rectangular or square magnet assembly 25 alone or with the mask 37. Alternatively, the magnets 27 and 28 could be of a circular or ovular or other curved configuration but, as mentioned, such a configuration does not provide the same uniformly linear response that is provided by rectangular magnets or other magnets having adjacent planar sides which afford the planar interface 36.

Secondly, the pressure-induced deflection of the diaphragm is linearized by incorporating a patterned array of depressions in the form of dimples 39 shown in FIGS. 5 and 6, which can be formed by stamping, chemical milling or other suitable techniques well known to those of usual skill in the art. The dimples are preferably uniformly spaced within a concentric ring, however, each ring should be rotated axially with respect to the preceding ring such that any radially outward straight line from the center of the diaphragm will be intercepted by a dimple, preferably within one or two rings. Further, the dimples need not be "can" shaped as shown in the drawings but would preferably be hemispherical in shape and would be represented in cross-section (one plane only) similarly to FIG. 8. In an alternative embodiment, shown in FIGS. 7 and 8, the patterned array of depressions in the diaphragm 20A comprises circular or annular corrugations 41–41, which provide a linear response. The depressions are not formed in the center of the diaphragm, to facilitate mounting/joining the post 26.

Also, the O-ring seal and mount arrangement affords relatively free flexure of the periphery of the diaphragm 20 and therefore provides the requisite sealing with minimal impact on sensitivity. In contrast, the usual prior art joints are welds or other fixed joints, which rigidly mount the associated diaphragm and, as a consequence, reduce sensitivity.

Third, and referring to FIGS. 3, 5 and 7, to maintain the above-mentioned constant spacing between the magnets and the sensor without degrading flexibility, the relatively free-floating diaphragm 20 incorporates a single point or multi-point restraint comprising a small protuberance or bump 42 located along its peripheral edge, preferably in line with the plane of the magnet interface 36. The protuberance 42 mates with a corresponding depression or dimple 43, FIG. 3, formed in the housing side 19. During pressure operation of the device 10, the protuberance 42 floats in its associated dimple 43 without decreasing the flexibility or sensitivity of response, but prevents rotation of the diaphragm along directions 46 about the axis 33, FIG. 3, and prevents translation in the directions 49, FIG. 3, transverse to the plane of the device 30 and the magnet means 25, either of which would reduce the sensitivity or accuracy of response. Please note, the point or points restraint 42–43 somewhat constrains movement along the directions 48 parallel to the plane of the interface, although such movement does not significantly hurt device performance. Also, the outer diameter of the diaphragm 20 preferably is machined or stamped to a close tolerance such that it fits snugly within the pressure vessel housing. This minimizes any variation in position during assembly and during repeated pressurization cycles.

Obviously, if desired, a plurality or multiplicity of such non-fixed, i.e., floating restraints 42 could be used. For example, a pair of restraints can be used, one each on opposite sides of the diaphragm, or four restraints could be located 90° apart, to completely constrain rotation or translation of the diaphragm, but with somewhat greater impact on sensitivity than occurs using the single restraint 42.

A second method of achieving this free floating stabilizing method is to form the dimple 42 as above but reverse the direction of the dimple 43 in the diaphragm.

The recess in the support member is also left in place. A ball bearing (not shown) is placed in between the two dimples and is kept in place by the pressure of the O-ring seal. This in effect locks the support member and the diaphragm together as a single unit but allows the diaphragm to flex at the periphery without any significant hindrance.

Alternatively, a single spot weld or a plurality or multiple number of spot welds could be used in situations where the somewhat increased rigidity and reduced sensitivity can be tolerated.

The preferred, dual magnet arrangement with the modified diaphragm design provides a highly linear and sensitive pressure sensing device. The transducer may be tailored for any pressure range by changing the diaphragm thickness and/or the depth and/or width of dimples or rings.

The cap covers the diaphragm and is intended to contain debris within the housing in the event the diaphragm fails.

In working embodiments of our device 10, the sensor was the SS9 manufactured by Micro Switch Corporation of 70 Wells Avenue, Newton, Mass. 02159. The diaphragm was constructed of 17-7 CH stainless steel, or NiSpan C, the diaphragm was 1.125 inches OD and was 0.005 to 0.018 inches thick and comprised over one hundred circular dimples chemically milled to a depth of 8 mils or pressed to a depth of 16 mils, the dimples being 15 mils ID for the chemically milled parts and 32 mils ID for the pressed parts, and the center-to-center spacing for the chemically milled parts ranged from 80 to 110 mils and the center-to-center spacing for the pressed parts ranged from 80 to 100 mils. The magnets are made by Permag Corporation, 2960 South Avenue, Toledo, Ohio 43609, are ⅛ inch cubes, and are of Samarium Cobalt material and provided a field in excess of 400 gauss and were mounted on a support post 0.003 to 0.010 inches from the Hall effect sensor face. The housing diameter is 1.56 inches and has a height of 1.80 inches.

As shown by curves 61 and 62, FIG. 10, for which the diaphragm was set in a single dimple restraint, and curve 63, for which the diaphragm was spot welded at two opposite points on the outer edge, the above working devices provided a substantially perfectly linear response, i.e., provided an unamplified signal in volts which was a substantially perfectly linear function over the investigated pressure range of 0 to about 450 psi. The difference in sensitivity exhibited by curves 61 and 62 on one hand and 63 on the other, illustrates the desirability of the floating-type restraint 42–43. This exhibited sensitivity, accuracy and linearity of response are in distinct contrast to devices constructed with single magnets and without the linear response diaphragm, which provide quasi-linearity over only a few psi.

FIG. 1 depicts a device 1 that is relatively simple and less sensitive and has restricted linearity in comparison to the device 10. The device 1 comprises: a housing 2; a pressure-flexible diaphragm 3 which, with the housing 2, defines a reference chamber 7 maintained at a constant reference pressure by a source (not shown); and a galvanomagnetic or Hall effect sensor 5 mounted, for example, to an associated circuit board 4 above a magnet 6 which is mounted to the diaphragm 3.

In the quiescent state, pressure applied to one side of the diaphragm 3 is exposed to the local ambient pressure or a self-contained reference pressure (this is generally a steady state value under all conditions) while pressure applied to the opposite face or the test pressure side is exposed to the pressurized fluid whose pressure is to be measured. In this situation and under any other steady state conditions, the magnet 6 remains at a constant distance from the Hall effect sensor 5 while the magnetic field intensity at the sensor 5 and the applied current and the resultant voltage within the device 5 are all at constant values. However, when either positive or negative pressure (with respect to the reference pressure) is introduced into the transducer as indicated schematically by the arrows 8, through the entrance port (not shown), the resulting applied pressure change deflects the diaphragm 3 and displaces the attached magnet 6 toward or away from the spatially fixed sensor 5. Depending upon the direction of movement of the magnet 6, the magnetic field experienced by the fixed position sensor 5 will decrease or increase, inducing a proportional change in the voltage output of the sensor 5. That is, the relative motion results in the generation of an output voltage signal from the Hall effect sensor 5 that is proportional to the change in magnetic field at the sensor and, thus, to the change in pressure at the diaphragm.

Having thus described preferred and alternative embodiments of our present invention, what is claimed is:

1. A pressure transducer providing a voltage output which is a linear function of pressure, comprising: a housing; a diaphragm within said housing dividing said housing into a reference pressure chamber and a sample pressure chamber, the latter adapted for receiving pressurized fluid at a selected pressure; said diaphragm having a pattern of depressions for providing deflection of said diaphragm along a direction coinciding with an axis of rotation thereof, said deflection closely approximating a linear output response function of the applied pressure; an O-ring between the periphery of said diaphragm and said housing non-fixedly sealing the periphery of said diaphragm against the interior of said housing; magnet means providing a uniform magnetic field gradient and comprising a pair of magnets mounted together along mating planar surfaces to the diaphragm and with their North and South axes oriented parallel and oppositely to one another and transverse to said deflection axis, for providing a uniformly varying magnetic field in the region of said interface; and a Hall effect sensor being mounted to the housing and closely adjacent to said magnet means and within the uniform magnetic field gradient proximate said interface.

2. The transducer of claim 1, wherein said diaphragm and said housing comprise at least one peripheral protuberance and mating depression for preventing relative movement between said diaphragm and said planar sensor.

3. The transducer of claim 1 or 2, wherein said magnets are rectangular or square.

4. The transducer of claim 3, further comprising a mask of magnetic field interposed between said magnet means and said sensor and having an aperture therein for shunting the magnetic lines of force except through said aperture.

5. The transducer of claim 4, wherein said aperture is aligned with and intercepts the lines of flux emanating from the region of said interface.

6. The transducer of claim 5, wherein said magnets are rectangular or square.

7. A pressure transducer for providing a voltage output which is a linear function of pressure and comprising: a housing; a diaphragm within said housing dividing said housing into a reference pressure chamber and a test chamber adapted for receiving fluid at a selected pressure; said diaphragm having a pattern of depressions that allow deflection of said diaphragm along an axis which provides a close approximation to a linear function of the test fluid pressure along a deflection axis of the diaphragm; an O-ring between the periphery of said diaphragm and said housing non-fixedly sealing the periphery of said diaphragm against the interior of said housing; magnet means comprising at least a magnet mounted to said diaphragm and oriented with the North-South axis thereof generally parallel to the plane of said diaphragm and transverse to an axis of deflection of said diaphragm; and a Hall effect sensor mounted to said housing and closely adjacent to and within the magnetic field of said magnet means; and further comprising a mask of magnetic material between said magnet means and said sensor and having an aperture therein for shunting the magnetic lines of force except those through said aperture, thereby to transmit a uniform magnetic field to said sensor.

8. The transducer of claim 7, wherein said diaphragm and said housing comprise at least one peripheral protuberance and mating depression for preventing movement of the diaphragm and associated movement of the magnet means in at least one of axial rotation and a radial direction with respect to the face of said fixed position sensor.

9. The transducer of claim 7, wherein said diaphragm and said housing comprise at least one peripheral protuberance and mating depression for preventing movement of the diaphragm and associated movement of the magnet means in at least one of axial rotation and a radial direction with respect to the face of said fixed position sensor.

* * * * *